United States Patent [19]

Moriwaki et al.

[11] Patent Number: 5,088,078
[45] Date of Patent: Feb. 11, 1992

[54] OPTICAL PICKUP APPARATUS

[75] Inventors: Isamu Moriwaki, Hiratsuka; Hiroyuki Kiguchi, Atsugi, both of Japan

[73] Assignee: Ricoh Company, Ltd., Tokyo, Japan

[21] Appl. No.: 350,512

[22] Filed: May 11, 1989

[30] Foreign Application Priority Data

May 18, 1988 [JP] Japan ................. 63-119759

[51] Int. Cl.$^5$ ............................................. G11B 7/095
[52] U.S. Cl. .................. 369/44.25; 369/44.28; 369/44.11
[58] Field of Search ............... 369/44.11, 44.29, 44.28, 369/44.25, 44.24, 44.54, 44.27, 44.41, 44.42

[56] References Cited

U.S. PATENT DOCUMENTS 4,617,654 10/1986 Gross et al. ................. 369/44.29
4,755,980 7/1988 Yoshimaru et al. .......... 369/44.29

Primary Examiner—Roy N. Envall, Jr.
Assistant Examiner—Hindi Nabil
Attorney, Agent, or Firm—Cooper & Dunham

[57] ABSTRACT

An optical pickup apparatus in which a laser beam reflected from an optical memory medium is separated and incident to a light-receiving element having a plurality of divided light-receiving faces and a focusing error signal is formed on the basis of a difference signal provided by a predetermined combination of light-receiving signals outputted from the respective light-receiving faces of the light-receiving element, comprises a bias signal forming device for forming a bias signal in accordance with a reflectance ratio of the optical memory medium based on a sum of the light-receiving signals outputted from the respective light-receiving faces of the light-receiving element; and a device for superimposing the bias signal on the focusing error signal in an accessing stand-by state with respect to the optical memory medium.

6 Claims, 4 Drawing Sheets

Fig. 1a
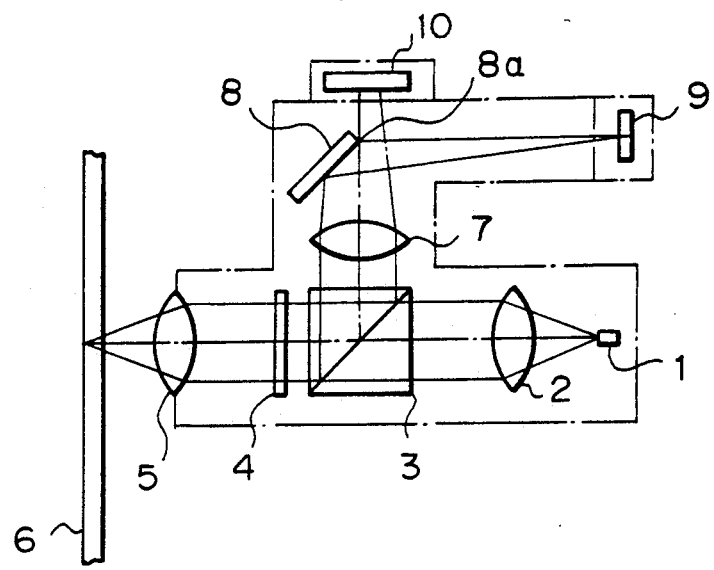
Fig. 1b
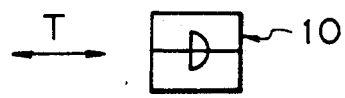
Fig. 2a    Fig. 2b
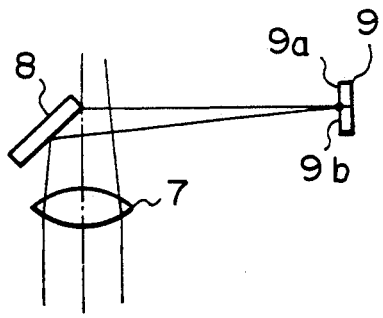    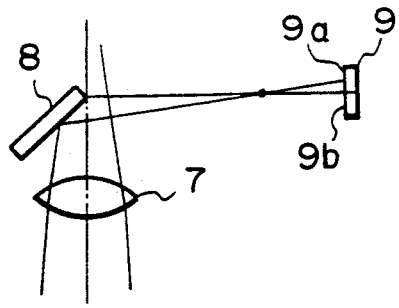
Fig. 2c
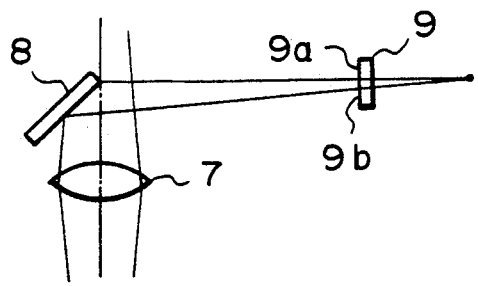

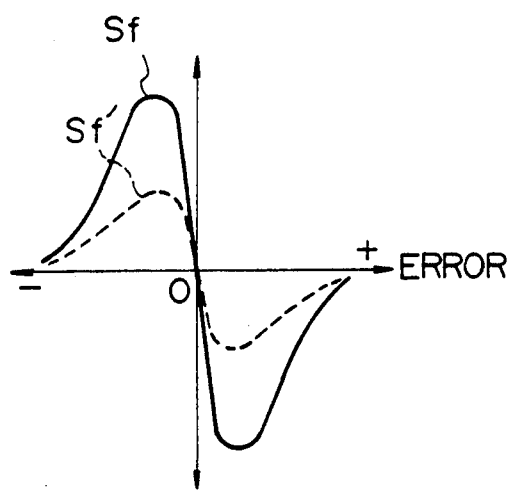 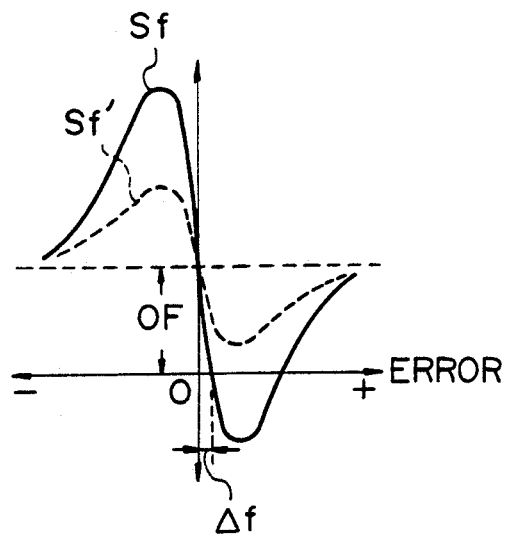

OPTICAL PICKUP APPARATUS

BACKGROUND OF THE INVENTION

The present invention relates to an optical pickup apparatus using a laser beam.

Recently, an optical disk memory device, in which an optical disk is used as an optical memory medium, has been proposed. In this optical disk, a recording track is formed on a data memory face of the disk and has a fine structure in which the track width is about 1 μm and the track pitch is about 2 μm for example. A laser beam having spot diameter about 1 μm is irradiated onto this recording track.

The data are stored by modulating the intensity of the laser beam corresponding to the data to be recorded while the optical disk is rotated. The stored data are reproduced by detecting the change in intensity level of a reflected light from the data memory face of the laser beam.

The optical pickup makes the laser beam to follow the recording track and focuses the beam onto a spot having a predetermined size and further forms an error signal and a reproducing signal for servo control.

In such an optical pickup, an optical disk cannot be restrained from being deteriorated when no accessing operation is performed with respect to the optical disk and it takes much time to perform the accessing operation.

SUMMARY OF THE INVENTION

It is therefore an object of the present invention to provide an optical pickup apparatus for restraining an optical disk from being deteriorated when no accessing operation is performed with respect to the optical disk and reducing the time required to perform the accessing operation.

The object of the present invention can be achieved by an optical pickup apparatus in which a laser beam reflected from an optical memory medium is separated and incident to a light-receiving element having a plurality of divided light-receiving faces and a focusing error signal is formed on the basis of a difference signal provided by a predetermined combination of light-receiving signals outputted from the respective light-receiving faces of the light-receiving element, the apparatus comprising a bias signal forming device for forming a bias signal in accordance with a reflectance ratio of the optical memory medium based on a sum of the light-receiving signals outputted from the respective light-receiving faces of the light-receiving element; and a device for superimposing the bias signal on the focusing error signal in an accessing stand-by state with respect to the optical memory medium.

Further objects and advantages of the present invention will be apparent from the following description of the preferred embodiments of the present invention as illustrated in the accompanying drawings.

BRIEF DESCRIPTION OF THE DRAWINGS

FIGS. 1a and 1b are views schematically showing an example of the construction of an optical pickup apparatus;

FIGS. 2a to 2c are schematic views for explaining the principle of a knife edge method;

FIGS. 3a and 3b are graphs showing a conventional example of the change in focusing error signal;

DESCRIPTION OF THE PREFERRED EMBODIMENTS

Figure 4:
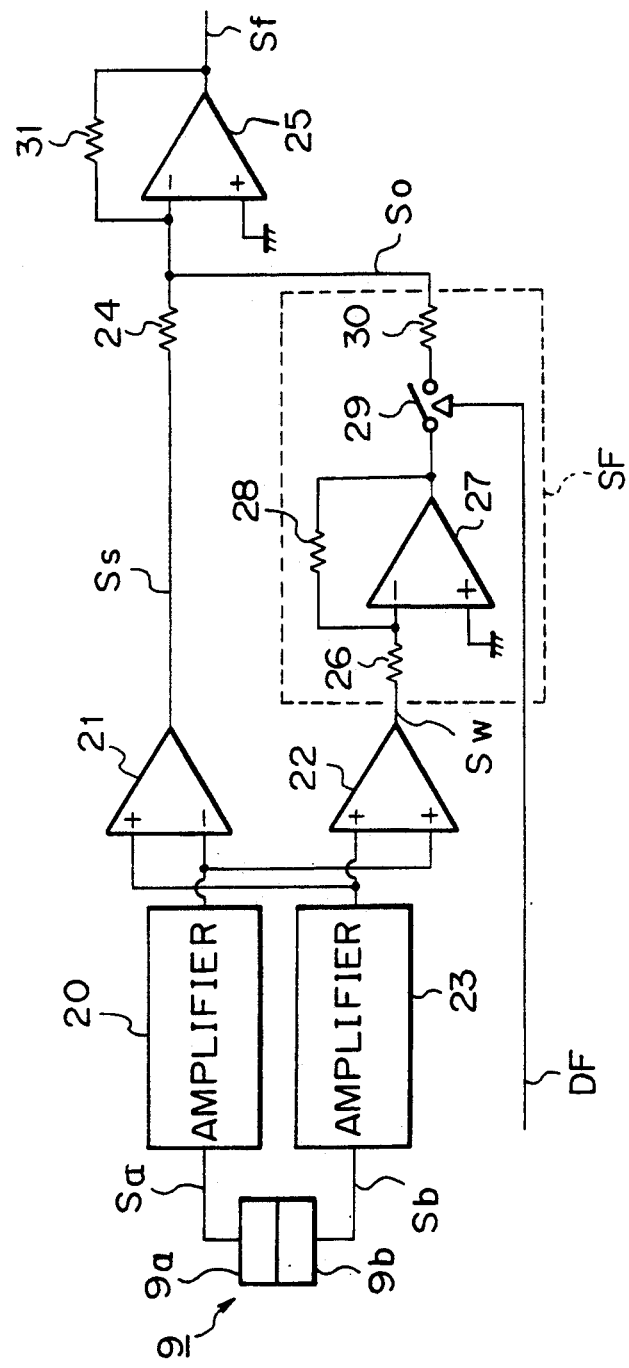
FIG. 4 is a circuit diagram showing a circuit for forming the focusing error signal in an optical pickup apparatus in accordance with one embodiment of the present invention.

The preferred embodiments of an optical pickup apparatus in accordance with the present invention will now be described in detail with reference to the accompanying drawings.

FIGS. 1a and 1b show an example of the schematic construction of the optical pickup. In this optical pickup, the laser beam is focused by a knife edge method and the optical pickup is integrally constructed and the entire optical pickup is moved in the radial direction of the optical disk.

In these figures, the laser beam outputted from laser diode or semiconductor laser element 1 is converted to a parallel laser beam by coupling lens 2 and passes through polarizing beam splitter 3. The laser beam is then converted to a circularly polarized light by ¼ wavelength plate 4, and thereafter is focused by objective lens 5, thereby forming an image on the recording track of optical disk 6.

The reflected light beam (which is called a signal light in the following description) from optical disk 6 is converted to an approximately parallel light beam through objective lens 5 again. Thereafter, the light beam passes through ¼ wavelength plate 4 again and is converted to a linearly polarized light in which the polarizing axis is perpendicular to the laser beam outputted from laser diode 1 so that the light beam is reflected by the polarizing beam splitter 3 in the direction of lens 7.

The light beam passing through lens 7 is reflected by divisional mirror 8 having a half thereof constituting a knife edge, and an image is formed onto light-receiving element 9 for focus servo having light-receiving faces divided into two by a divisional line parallel to ridgeline 8a of divisional mirror 8. With respect to the remaining portion of the light beam, as shown in FIG. 1b, an image is formed onto light-receiving element 10 for track servo having light-receiving faces divided into two in the tracking direction T perpendicular to ridgeline 8a.

Objective lens 5 is provided with a tracking mechanism for positioning objective lens 5 in the radial direction of optical disk 6 and a focusing mechanism for focusing the objective lens. The tracking and focusing mechanisms constitute a mechanism for moving the objective lens.

By an unillustrated servo control section, the error in position of the laser beam on the recording track (tracking error) is detected on the basis of an output signal of light-receiving element 10. The operation of the tracking mechanism is controlled in accordance with the tracking error and objective lens 5 is moved in a direction in which the shift in position of the laser beam on the recording track is reduced. Further, the recorded data are taken out of the output signal of light-receiving element 10.

The error in focus of the laser beam is detected as follows.

As shown in FIG. 2a, when the laser beam is focused on optical disk 6, the converging position P of the laser beam converged by lens 7 is in conformity with light-receiving faces 9a and 9b of light-receiving element 9 so that the light-receiving amount of light-receiving face 9a becomes equal to that of light-receiving face 9b.

As shown in FIG. 2b, when optical disk 6 is located in a position away from the focusing position of the laser beam to be focused, the converging position P of the laser beam converged by lens 7 is located in front of light-receiving faces 9a and 9b of light-receiving element 9 so that the light-receiving amount of light-receiving face 9a becomes greater than that of light-receiving face 9b.

As shown in FIG. 2c, when optical disk 6 approaches the focusing position of the laser beam, the converging position P of the laser beam converged by lens 7 is located backwards from light-receiving faces 9a and 9b of light-receiving element 9 so that the light-receiving amount of light-receiving face 9a becomes smaller than that of light-receiving face 9b.

Accordingly, as shown in FIG. 3a, the error in focus can be detected on the basis of the difference in light-receiving signal between light-receiving faces 9a and 9b. By the operation of the servo control section, the focusing mechanism is controlled such that this error is reduced. Thus, objective lens 5 is moved in a direction in which the focusing shift of the laser beam on the recording track is reduced.

Even when no accessing operation is performed with respect to optical disk 6, the face of optical disk 6 is deteriorated if the laser beam is focused on optical disk 6.

To solve such a problem, in the general apparatus, when a constant time passes in a state in which no accessing operation is performed with respect to optical disk 6, objective lens 6 is greatly moved by the focusing mechanism and thereby the focus of the laser beam is completely shifted from the position thereof to be focused.

However, in such a method, when the next accessing operation is performed with respect to optical disk 6, it takes much time to position the focus of the laser beam into the position thereof to be focused, thereby increasing the time for performing the accessing operation.

To solve this problem, as shown in FIG. 3b, constant offset signal OF is superimposed on difference signal Sf of the light-receiving signals from the two light-receiving faces of light-receiving element 9 so that the focus of the laser beam is positioned (defocused) in a position away by distance $\Delta f$ from the position of the laser beam to be focused within a region in which a focusing servo control system is operated.

However, the levels in intensity of reflected light beam from optical disk 6 with respect to data-recording and data-unrecording sections of the recording track are different from each other. Namely, the level in intensity of the reflected light beam of the latter is greater than that of the former.

Accordingly, as shown in FIGS. 3a and 3b, the level in voltage of difference signal Sf' in the data-recording section is smaller than that of difference signal Sf in the data-unrecording section so that the focus of the laser beam is completely located in a position outside the position thereof to be focused with respect to the data-recording section.

FIG. 4 shows a circuit for forming a focusing error signal in an optical pickup apparatus in accordance with one embodiment of the present invention. This focusing error signal forming circuit is applied to an optical pickup apparatus having the same construction as that of the optical pickup apparatus shown in FIGS. 1a and 1b.

In this figure, light-receiving signal Sa of light-receiving face 9a of light-receiving element 9 is supplied through amplifier 20 to "−" input terminal of of difference signal operating circuit 21, and is supplied to one of "+" input terminals of sum signal operating circuit 22.

Light-receiving signal Sb of light-receiving face 9b of light-receiving element 9 is supplied through amplifier 23 to "+" input terminal of difference signal operating circuit 21 and is supplied to the other of the "+" input terminals of sum signal operating circuit 22.

Difference signal operating circuit 21 calculates the difference in voltage between light-receiving signals Sa and Sb, and its output difference signal Ss is supplied to inverted amplifier 25 through input resistor 24.

Sum signal operating circuit 22 calculates a sum in voltage of light-receiving signals Sa and Sb and its output sum signal Sw is supplied to circuit SF for forming an offset signal.

In offset signal forming circuit SF, inverted amplifier 27 amplifies sum signal Sw at an amplification factor based on the ratio of input resistor 26 and feedback resistor 28. An output signal thus amplified is supplied as offset signal So to inverted amplifier 25 through switch 29 turned on by defocus signal DF outputted from an unillustrated control section in an accessing stand-by state, and input resistor 30.

Inverted amplifier 25 amplifies difference signal Ss and offset signal So at amplification factors respectively based on the ratio of input resistor 24 and feedback resistor 31 and the ratio of input resistor 30 and feedback resistor 31, thereby forming focusing error signal Sf on which difference signal Ss and offset signal So are superimposed. Focusing error signal Sf is outputted to an unillustrated focusing servo control section.

In the above-mentioned construction, defocus signal DF is not outputted in a state in which the accessing operation is performed with respect to optical disk 6 so that switch 29 of offset signal forming circuit SF is turned off. Accordingly, offset signal forming circuit SF is not operated and offset signal So is not outputted.

Therefore, when the accessing operation is performed with respect to optical disk 6, only difference signal Ss is outputted as focusing error signal Sf through inverted amplifier 25.

On the other hand, in a state in which no accessing operation is performed for a time longer than a predetermined time with respect to optical disk 6, defocus signal DF is outputted so that switch 29 of offset signal forming circuit SF is turned on and thereby offset signal forming circuit SF attains an operable state, thereby outputting offset signal So multiplied at a predetermined rate with respect to sum signal Sw.

Thus, when no accessing operation is performed with respect to optical disk 6, the signal in which offset signal So is superimposed on difference signal Ss is outputted as focusing error signal Sf through inverted amplifier 25.

Figure 5A:
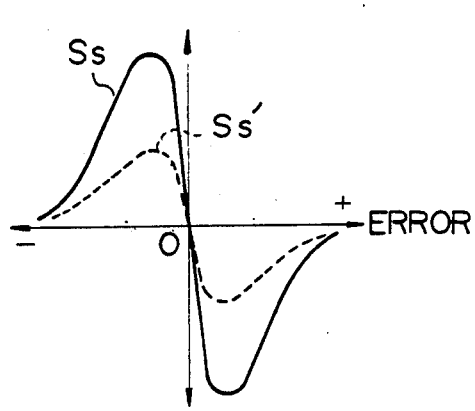
FIG. 5a is a graph showing the change in difference signal.
Figure 5B:
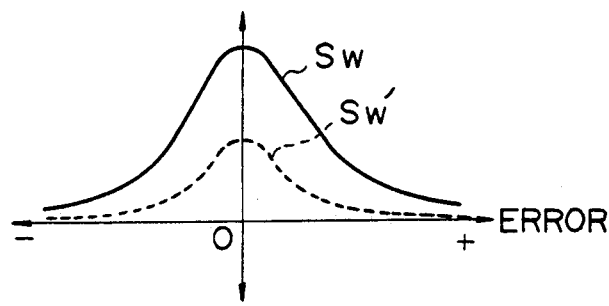
FIG. 5b is a graph showing the change in sum signal.

When the laser beam is focused onto a data-unrecording section of the recording track of optical disk 6, difference signal Ss and sum signal Sw are changed in accordance with the error in focus of the laser beam from the position thereof to be focused, as shown by solid line in FIGS. 5a and 5b, respectively.

When the laser beam is focused onto a data-recording section of the optical disk, since the reflectance ratio in this section is smaller than that of the data-unrecording section, difference signal Ss' and sum signal Sw' are changed in accordance with the error in focus of the laser beam from the position thereof to be focused, as shown by broken line in FIGS. 5a and 5b, respectively.

Thus, difference signal Ss' and sum signal Sw' provided when the laser beam is focused onto the data-recording section has a wholly reduced voltage in accordance with the reflectance ratio in comparison with difference signal Ss and sum signal Sw provided when the laser beam is focused onto the data-unrecording section.

Figure 6A:
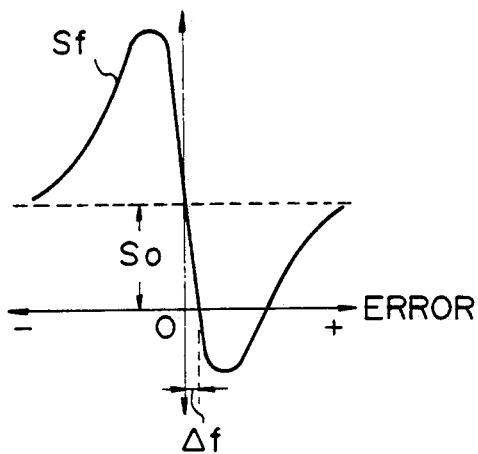
FIG. 6a is a graph showing an example of the change in focusing error signal.

Accordingly, for example, as shown in FIG. 6a, in the state in which the laser beam is irradiated onto the data-unrecording section, when offset signal So is set by focusing error signal Sf to have a voltage value for positioning the focusing servo control system in a position offset by distance $\Delta f$ from the position of the laser beam to be focused, and the irradiating position of the laser beam is switched to the data-recording section and the level in voltage of difference signal Ss' is reduced, sum signal Sw' is also reduced in voltage at the same ratio and therefore offset signal So' is also reduced in voltage at this ratio.

Figure 6B:
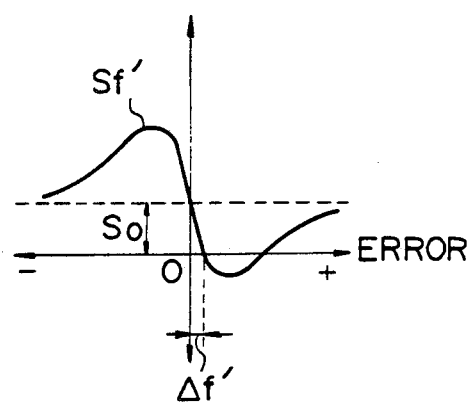
FIG. 6b is a graph showing another example of the change in focusing error signal.

As a result, as shown in FIG. 6b even in such a case, the laser beam can be positioned by the focusing servo control system into the beam position offset by distance $\Delta f'$ approximately equal to distance $\Delta f$ from the position of the laser beam to be focused.

Distance $\Delta f$ is set to have a value within a region in which the focusing servo control system is operated.

In the above-mentioned embodiment, offset signal So at the defocusing time is formed on the basis of sum signal Sw so that the value in voltage of offset signal So is changed in accordance with the reflectance ratio in the irradiating position of the laser beam on optical disk 6, thereby forming focusing error signal Sf in which suitable offset signal So is superimposed on difference signal Ss at any time.

Thus, at the defocusing time, the focusing position of the laser beam can be prevented from being shifted from the region in which the focusing servo control system is operated so that the time required to perform the accessing operation can be reduced.

In the above-mentioned embodiment, the present invention is applied to the optical pickup apparatus using the knife edge method as a focusing control method, but can be similarly applied to an optical pickup apparatus using another focusing control method except for the knife edge method.

Further, the present invention can be similarly applied to an optical pickup apparatus except for the optical pickup apparatus used to perform the accessing operation with respect to the optical disk.

As mentioned above, in accordance with the present invention, a bias signal of the focusing error signal is formed on the basis of a sum of the light-receiving signals from the respective light-receiving faces of the light-receiving element for detecting the error in focus. This bias signal is superimposed on the focusing error signal in the accessing stand-by state with respect to the optical memory medium. Accordingly, the optical disk can be restrained from being deteriorated when no accessing operation is performed with respect to the optical disk, and the accessing time can be reduced.

Figure 7:
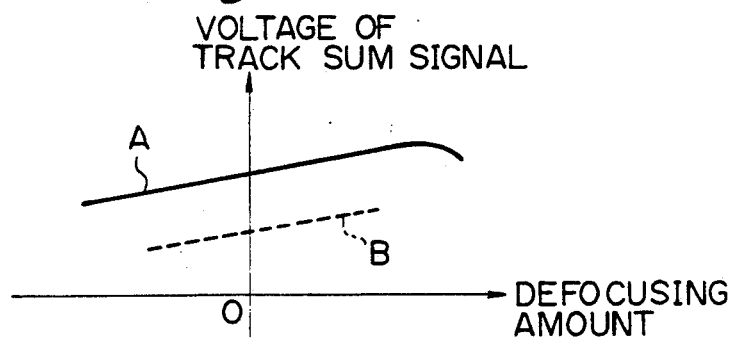
FIG. 7 is a graph showing the relation between a track sum signal and a defocusing amount of a laser beam in another embodiment of the present invention.

FIG. 7 shows another embodiment of the present invention. In this embodiment, a bias signal is provided by a sum signal of a track light-receiving element, which is different from the above-mentioned embodiment in which bias signal So is provided by sum signal Sw of the focus light-receiving element. In FIG. 7 showing the relation between the track sum signal and the defocusing amount of the beam, the level in voltage of the track sum signal in the data-unrecording section of the memory medium is shown by curve A of solid line, and the level in voltage of the track sum signal in the data-recording section shown by curve B of broken line is reduced from that in the data-unrecording section. The level in voltage of the sum signal by the recording operation is reduced at the same level with respect to both the focus sum signal and the track sum signal so that the track sum signal can be used in a way similar to the focus sum signal.

According to this embodiment of FIG. 7, the effects of the present invention can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical pickup apparatus comprising:
    a light-receiving element having at least one pair of divided light-receiving faces for receiving a part of a laser beam reflected from an optical memory medium, and adapted to output voltage signals representing an amount of light received by each of said light-receiving faces;
    a difference signal operating means electrically connected to said light-receiving element for outputting a focus difference signal on the basis of said voltage signals from said light-receiving element;
    a sum signal operating means electrically connected to said light-receiving element for outputting a focus sum signal on the basis of said voltage signals from said light-receiving element; and
    a focusing error signal generating means electrically connected to said difference signal operating means, said sum signal operating means and a focusing servo control section, for outputting as a first focusing error signal said focus difference signal from said difference signal operating means in a state where an accessing operation is performed with respect to said optical memory medium, and for amplifying said focus sum signal from said sum signal operating means by a predetermined ratio to thereby form an offset signal in response to a defocusing signal outputted from said focusing servo control section in a state where no accessing operation is performed for a period of time longer than a predetermined period of time with respect to said optical memory medium, for superimposing said offset signal on said focus difference signal from said difference signal operating means, and for outputting said superimposed signal as a second focusing error signal so as to cause a focus of said laser beam to be positioned in a position away by a predetermined distance from a focused position of said laser beam.

2. An optical pickup apparatus according to claim 1, in which said focusing error signal generating means comprises an offset signal forming circuit electrically connected to said focusing servo control section and said sum signal operating means for amplifying said focus sum signal from said sum signal operating means by said predetermined ratio to thereby form said offset signal upon receiving said defocusing signal from said focusing servo control section, and for outputting said offset signal.

3. An optical pickup apparatus according to claim 2, in which said focusing error signal generating means comprises an offset signal superimposing means electrically connected to said difference signal operating means and said offset signal forming circuit for outputting said focus difference signal from said difference signal operating means as said first focusing error signal upon not receiving said offset signal from said offset signal forming circuit, and for superimposing said offset signal from said offset signal forming circuit on said focus difference signal from said difference signal operating means upon receiving said offset signal from said offset signal forming circuit, and for outputting said superimposed signal as said second focusing error signal.

4. An optical pickup apparatus comprising:
a first light-receiving element for focus servo having at least one pair of first divided light-receiving faces for receiving a part of a laser beam reflected from an optical memory medium, and adapted to output first voltage signals representing an amount of light received by each of said first light-receiving faces;
a second light-receiving element for track servo having at least one pair of second divided light-receiving faces for receiving another part of said laser beam reflected from said optical memory medium, and adapted to output second voltage signals representing an amount of light received by each of said second light-receiving faces;
a focus difference signal operating means electrically connected to said first light-receiving element for outputting a focus difference signal on the basis of said first voltage signals from said first light-receiving element;
a track sum signal operating means electrically connected to said second light-receiving element for outputting a track sum signal on the basis of said second voltage signals from said second light-receiving element; and
a focusing error signal generating means electrically connected to said focus difference signal operating means, said track sum signal operating means and a focusing servo control section, for outputting as a first focusing error signal said focus difference signal from said focus difference signal operating means in a state where an accessing operation is performed with respect to said optical memory medium, and for amplifying said track sum signal from said track sum signal operating means by a predetermined ratio to thereby form an offset signal in response to a defocusing signal outputted from said focusing servo control section in a state where no accessing performed is performed for a period of time longer than a predetermined period of time with respect to said optical memory medium, for superimposing said offset signal on said focus difference signal from said focus difference signal operating means, and for outputting said superimposed signal as a second focusing error signal so as to cause a focus of said laser beam to be positioned in a position away by a predetermined distance from a focused position of said laser beam.

5. An optical pickup apparatus according to claim 4, in which said focusing error signal generating means comprises an offset signal forming circuit electrically connected to said focusing servo control section and said track sum signal operating means for amplifying said track sum signal from said track sum signal operating means by said predetermined ratio to thereby form said offset signal upon receiving said defocusing signal from said focusing servo control section, and for outputting said offset signal.

6. An optical pickup apparatus according to claim 5, in which said focusing error signal generating means comprises an offset signal superimposing means electrically connected to said focus difference signal operating means said offset signal forming circuit for outputting said focus difference signal from said focus difference signal operating means as said first focusing error signal upon not receiving said offset signal from said offset signal forming circuit, and for superimposing said offset signal from said offset signal forming circuit on said focus difference signal from said focus difference signal operating means upon receiving said offset signal from said offset signal forming circuit, and for outputting said superimposed signal as said second focusing error signal.

* * * * *